(12) United States Patent
Sakurai et al.

(10) Patent No.: US 8,101,031 B2
(45) Date of Patent: Jan. 24, 2012

(54) HOLLOW POWER TRANSMISSION SHAFT AND METHOD OF MANUFACTURING THE SAME

(75) Inventors: Katsuhiro Sakurai, Shizuoka (JP); Toru Nakagawa, Shizuoka (JP); Masamichi Shinbo, Shizuoka (JP); Masami Yamaguchi, Shizuoka (JP); Tsuneaki Hiraoka, Shizuoka (JP)

(73) Assignee: NTN Corporation, Osaka (JP)

( * ) Notice: Subject to any disclaimer, the term of this patent is extended or adjusted under 35 U.S.C. 154(b) by 682 days.

(21) Appl. No.: 11/659,135

(22) PCT Filed: Jul. 21, 2005

(86) PCT No.: PCT/JP2005/013390
§ 371 (c)(1),
(2), (4) Date: Sep. 2, 2008

(87) PCT Pub. No.: WO2006/013730
PCT Pub. Date: Feb. 9, 2006

(65) Prior Publication Data
US 2009/0082117 A1  Mar. 26, 2009

(30) Foreign Application Priority Data

Aug. 2, 2004 (JP) .................. 2004-225730
Aug. 3, 2004 (JP) .................. 2004-227013
Aug. 25, 2004 (JP) .................. 2004-245784

(51) Int. Cl.
*B21C 37/16* (2006.01)
*B21D 22/28* (2006.01)
*C21D 1/10* (2006.01)
*F16C 3/02* (2006.01)

(52) U.S. Cl. ........................ 148/570; 464/183
(58) Field of Classification Search .............. 464/179, 464/183; 219/643; 148/570, 572; 72/368
See application file for complete search history.

(56) References Cited

U.S. PATENT DOCUMENTS
3,472,990 A   10/1969   Seulen et al.
(Continued)

FOREIGN PATENT DOCUMENTS
DE   199 29 639   2/2001
(Continued)

OTHER PUBLICATIONS
Machine Translation of JP 2001-208037.*
(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A hollow shaft material is provided with, on an outer peripheral surface side thereof, for example, a movable induction heating coil wrapped therearound. While a high-frequency current with a predetermined frequency is caused to flow through the induction heating coil, the induction heating coil is axially moved to perform induction hardening of the hollow shaft material from the outer peripheral surface side. At this moment, the frequency of the high-frequency current caused to flow through the induction heating coil is set relatively low as to the small-diameter portions, which have a relatively small thickness, and the frequency of the high-frequency current caused to flow through the induction heating coil is set relatively high as to the large-diameter portion, which has a relatively small thickness.

1 Claim, 12 Drawing Sheets

U.S. PATENT DOCUMENTS

| | | | |
|---|---|---|---|
| 7,442,906 B2 * | 10/2008 | Tanaka et al. | 148/572 |
| 2002/0182438 A1 | 12/2002 | Wakita et al. | |
| 2004/0235575 A1 * | 11/2004 | Sakurai et al. | 464/179 |
| 2007/0209740 A1 * | 9/2007 | Morimoto | 148/572 |
| 2007/0251606 A1 | 11/2007 | Wakita et al. | |
| 2008/0280691 A1 * | 11/2008 | Stueckrad et al. | 464/183 |

FOREIGN PATENT DOCUMENTS

| | | |
|---|---|---|
| EP | 1 262 671 | 12/2002 |
| JP | 63-76821 | 4/1988 |
| JP | 1-95822 | 4/1989 |
| JP | 04-014818 | 2/1992 |
| JP | 06-281010 | 10/1994 |
| JP | 09-68233 | 3/1997 |
| JP | 11-101259 | 4/1999 |
| JP | 11-247835 | 9/1999 |
| JP | 2001-208037 | 8/2001 |
| JP | 2002-349538 | 12/2002 |
| JP | 2002-356742 | 12/2002 |
| JP | 2003-90325 | 3/2003 |
| JP | 2003-094141 | 4/2003 |
| JP | 2003-175701 | 6/2003 |
| JP | 2003-314579 | 11/2003 |
| JP | 2003-343539 | 12/2003 |

OTHER PUBLICATIONS

Machine Translation of JP 2003-314579.*
Machine Translation of JP 2004-340335.*
Hartshorn, L. Radio-Frequency Heating. Nature (May 11, 1946), p. 607-610. TK4601 .H3.*
Rudnev, V. Handbook of Induction Heating. New York, 2003. p. 111. TK4601 .H24 2003.*
Supplementary European Search Report dated Apr. 28, 2008 for European Application No. 05 76 6324.
Japanese Office Action issued Jul. 14, 2010 in corresponding Japanese Application No. 2004-225730 w/partial translation.
International Preliminary Report on Patentability and Written Opinion of the International Searching Authority issued Feb. 6, 2007 in International (PCT) Application No. PCT/JP2005/013390.
European Search Report issued Sep. 15, 2008 in European Application No. 08012227.
European Search Report issued Sep. 15, 2008 in European Application No. 08012228.
Notification of Interrogation issued Jun. 23, 2011 in corresponding Japanese Application No. 2004-225730.

* cited by examiner

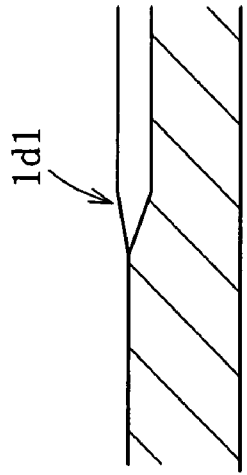
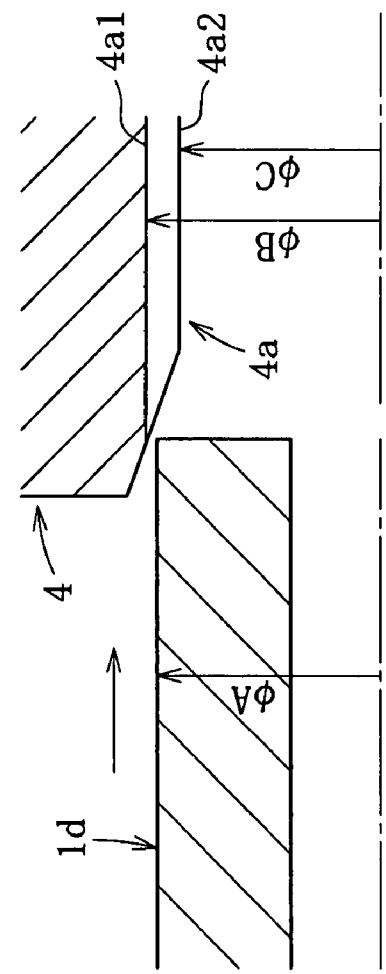
FIG. 10(b)
FIG. 10(a)

HOLLOW POWER TRANSMISSION SHAFT AND METHOD OF MANUFACTURING THE SAME

BACKGROUND OF THE INVENTION

1. Field of the Invention

The present invention relates to a hollow power transmission shaft coupled to a joint such as a constant velocity universal joint, and to a method of manufacturing the hollow power transmission shaft. The hollow power transmission shaft according to the present invention is applicable, for example, to a drive shaft or a propeller shaft which is a component of a power transmission system of an automobile.

2. Description of the Related Art

For example, in a power transmission system of an automobile, a power transmission shaft for transmitting power from a reduction gear (differential) to driving wheels is often referred to as a drive shaft. Especially in a drive shaft used for a front-engine front-drive vehicle, a large working angle and constancy of velocity are required in steering front wheels, and a function of absorbing axial displacement is required in relation to a suspension system. In many cases, therefore, there has been adopted a mechanism structured such that the drive shaft is coupled at one end thereof to a reduction gear side via a slidable constant velocity universal joint such as a double offset-type constant velocity universal joint or a tripod-type constant velocity universal joint, and at the other end thereof to a driving wheel side via a fixed constant velocity universal joint such as a Birfield-type constant velocity universal joint (which is also referred to as Rzeppa joint).

Presently as well as conventionally, a solid shaft has been often used as the drive shaft as mentioned above. Recently, however, there has been a growing demand for the adoption of a hollow shaft as the drive shaft with a view to saving weight of the automobile, achieving functional improvements through an increase in rigidity of the drive shaft, enhancing tranquility within a cabin of the automobile through optimization of tuning of a flexural primary natural frequency, and so on.

Examples of the hollow power transmission shaft applied to the drive shaft or the like are known from, for example, JP 2002-349538 A, JP 2002-356742 A, and JP 2003-90325 A.

In JP 2002-349538 A, an inner peripheral surface of a hollow shaft is subjected to a thermosetting treatment substantially over an entire axial range thereof. The thermosetting treatment is performed for an entire depth region extending from an outer peripheral surface of the hollow shaft to the inner peripheral surface thereof through, for example, induction hardening and tempering from the outer peripheral surface side (see paragraph 0012 in JP 2002-349538 A)

In JP 2002-356742 A, a thermosetting treatment is performed for an entire depth region extending from an outer peripheral surface of a hollow shaft to an inner peripheral surface thereof substantially over an entire axial range thereof through, for example, induction hardening and tempering (see paragraph 0012 in JP 2002-356742 A).

In JP 2003-90325 A, a hollow shaft is subjected to induction hardening at a hardening ratio of 0.7 to 0.9 in order to make a static strength and torsional fatigue strength of the hollow shaft equal to or higher than those of a solid shaft.

In the hollow shaft of this type, a spline for coupling the hollow shaft to a constant velocity universal joint or the like maybe be formed at an end of the hollow shaft. So-called press working, namely, a process of axially press-fitting the end of the shaft into a dice having an inner periphery provided with a spline molding portion is known as a method of molding the spline (e.g., see JP 2003-094141 A). Press working is more advantageous than component rolling in that thin-walled articles can be handled as well.

A hollow power transmission shaft applied to a drive shaft or the like is manufactured by, for example, drawing a pipe material to mold a hollow shaft material having a large-diameter portion along an axially central portion thereof and small-diameter portions along axially opposite a lateral portion thereof, respectively, machining the hollow shaft material as desired according to need, and then heat-treating the hollow shaft material (e.g., see JP 11-101259 A and JP 2001-208037 A).

In the hollow power transmission shaft of this type, a sealing plug is fitted onto an inner periphery of each end of a hollow portion thereof so as to prevent a lubricant (grease) enclosed in the constant velocity universal joint from entering the hollow portion. In some cases, a metal plug is used as the sealing plug. However, the inner periphery of the end needs to be finished through shaving in order to control a press-fit margin and press-fit position with respect to the hollow portion. Consequently, a problem of higher working cost is caused. For this reason, there have been proposed a sealing plug formed of a rubber material such as chloroprene rubber (CR) or nitrile rubber (NBR) (JP 06-281010 A) and a sealing plug formed of elastomer (JP 09-68233 A).

In general, in order to achieve an increase in rigidity and a reduction in weight, the hollow power transmission shaft of this type has, along an axially central portion thereof, a large-diameter portion with a relatively small thickness, and has, along an axially opposite lateral portion thereof, small-diameter portions with a relatively large thickness so as to ensure a certain strength. Thus, the hollow power transmission shaft of this type has a difference in thickness in the axial direction thereof. Therefore, hardening conditions cannot be set with ease, and stable quality cannot be ensured by a heat treatment in some cases. That is, if the hardening conditions are set in accordance with the large-diameter portion with the relatively small thickness, there are some cases in which a depth of a hardened layer becomes insufficient in the small-diameter portions with the relatively large thickness, so a desired strength cannot be achieved. On the other hand, if the hardening conditions are set in accordance with the small-diameter portions with the relatively large thickness, there are some cases in which the large-diameter portion with the relatively small thickness is overheated, and a texture thereof becomes coarse to an extent of causing a decrease in strength after hardening.

In the hollow power transmission shaft of this type, for example, the large-diameter portion and the small-diameter portions may be made different in hardening ratio (ratio of the depth of the hardened layer to a wall thickness thereof) for the purpose of enhancing the balance of strength or the like. In a conventional manufacturing method, however, the same inconvenience as described above may occur.

In spline molding based on the conventional press working, the material plastically flows in a counter press-fit direction while an end of the shaft is axially press-fitted into a dice. Further, a relatively large amount of the material flows. As a result, the molded spline assumes such a shape that a terminal end thereof is larger in tooth thickness than an axial end-side portion thereof, and that the terminal end is substantially increased in O.P.D. in comparison with the other portions. The over pin diameter (O.P.D.) is a value obtained by placing pins of a predetermined diameter on tooth portions of the spline, which face each other at an angle of 180°, respectively, and measuring a maximum spacing dimension between both the pins in a diametral direction of the shaft. Balls of a predetermined diameter may be used instead of the pins (over ball diameter). When the spline mentioned above, whose terminal end is substantially increased in O.P.D., is fitted into a spline hole of a mating member such as an inner wheel of a constant velocity universal joint, the portion with the increased O.P.D. exerts such a force that opens a part of the spline in the spline hole. In consequence, the mating member may decrease in strength.

In addition, when the shaft and the mating member are spline-fitted to each other, the shaft may have a torsional angle in order to restrict the backlash (clearance) of fitted portions. In the case of the spline whose terminal end is substantially increased in O.P.D., however, the torsional angle cannot be optimally set with ease.

The rubber sealing plug disclosed in JP 06-281010 A needs to be press-fitted into a hollow portion with a relatively large force. Therefore, there is caused a problem in that a considerable amount of labor is required in performing a mounting operation.

The elastomer sealing plug disclosed in JP 09-68233 A is designed to simplify a mounting operation through the concomitant use of a stopper insert made of a shape memory alloy. As a result, however, the number of parts is increased.

Both the sealing plugs are available as parts each molded into a desired shape and with a desired dimension. As a result, there is also a problem of higher manufacturing cost.

SUMMARY OF THE INVENTION

It is an object of the present invention to provide a method of manufacturing a hollow power transmission shaft, which makes it possible to ensure stable quality even when there is a difference in wall thickness or hardening ratio along an axial direction thereof.

It is another object of the present invention to provide a manufacturing method which makes it possible to mold a spline of the hollow power transmission shaft of this type with accuracy by means of press working.

It is still another object of the present invention to provide a hollow power transmission shaft reduced in weight, manufactured at low cost, equipped with an easily sealable hollow portion, and composed of a small number of parts.

In order to achieve the above-mentioned object, according to the present invention, there is provided a method of manufacturing a hollow power transmission shaft having a large-diameter portion formed along an axially central portion thereof and small-diameter portions formed along axially opposite lateral portion thereof, the small-diameter portions being located laterally with respect to the large-diameter portion, the method including: subjecting a pipe material to plastic working to mold a hollow shaft material having the large-diameter portion and the small-diameter portions; and performing induction hardening of the hollow shaft material with a frequency of a high-frequency current in a predetermined region thereof set different from a frequency of a high-frequency current in another region thereof.

In general, induction hardening is a heat treatment method in which the vicinity of a surface of a steel material is heated to be hardened with an aid of electromagnetic induction based on a high-frequency current. It has been known that an induction current (eddy current) generated through electromagnetic induction becomes more likely to concentratedly flow to the vicinity of the surface of the steel material and decrease abruptly toward a central portion thereof as a frequency of the high-frequency current leading to an induction heating coil is increased. In other words, a skin effect of concentrating the induction current on the vicinity of the surface of the steel material is enhanced as the frequency of the high-frequency current is increased, and is reduced on the contrary as the frequency of the high-frequency current is reduced. Accordingly, if induction hardening is carried out with the frequency of the high-frequency current in a predetermined region set different from the frequency of the high-frequency current in the other regions in accordance with the difference in wall thickness or hardening ratio along the axial direction of a hollow shaft material, the heat treatment quality in respective portions of the hollow shaft material can be enhanced. As a result, stable quality can be ensured as a whole.

As described above, the hollow power transmission shaft of this type usually has the large-diameter portion with the relatively small thickness formed along the axially central portion thereof, and the small-diameter portions with the relatively large thickness formed along the axially opposite lateral portion thereof. Accordingly, when the frequency of the high-frequency current in performing induction hardening of the large-diameter portion of the hollow shaft material is set relatively high and the frequency of the high-frequency current in performing induction hardening of the small-diameter portions of the hollow shaft material is set relatively low, the heat treatment quality in the large-diameter portion and the small-diameter portions can be improved. As a result, stable quality can be ensured as a whole.

Induction hardening is carried out according to a stationary mode or a movable mode. In the present invention, either of the two modes can be adopted. In a case where the stationary mode is adopted, it is appropriate to dispose a plurality of induction heating coils in accordance with the types of frequencies of a high-frequency current. In a case where the movable mode is adopted, the frequency of a high-frequency current leading to an induction heating coil is changed.

Swaging, press working, or the like is adopted as the aforementioned plastic working. The former, namely, swaging includes rotary swaging and link-type swaging. Either of rotary swaging and link-type swaging can be adopted. For example, in rotary swaging, which is a working method for drawing a pipe material, a pair of dices and backers or a plurality of pairs of dices and backers, which have been built in a main shaft within a machine, make rotational movements, and also make vertical movements having a certain stroke due to an outer peripheral roller and protrusions on the backers, so the pipe is struck while being inserted. In press working, which is another working method for drawing a pipe material, the pipe material is pressed into a dice in an axial direction thereof.

For example, a carbon steel for machine structural use such as STKM or STMA, an alloy steel obtained by adding an alloy element to the carbon steel as a base to improve workability, hardening properties and the like, or a case-hardened steel such as SCr, SCM, or SNCM can be used as a substance of the pipe material.

In order to achieve the above-mentioned another object, according to the present invention, there is provided a method of manufacturing a hollow power transmission shaft having a large-diameter portion formed along an axially central portion thereof and small-diameter portions, which have splines formed at ends thereof respectively, formed along axially opposite lateral portion thereof, the small-diameter portions being located laterally with respect to the large-diameter portion, the method including: drawing a pipe material to form a hollow shaft material having the large-diameter portion and the small-diameter portions; preparing a dice having on an inner periphery thereof a spline molding portion, whose maximum diameter is larger than an outer diameter of the ends of the small-diameter portions of the hollow shaft material and whose minimum diameter is smaller than the outer diameter of the ends of the small-diameter portions of the hollow shaft material; and axially press-fitting the ends of the small-diameter portions of the hollow shaft material into the spline molding portion of the dice to mold the splines at the ends respectively.

The maximum diameter of the spline molding portion provided on the inner periphery of the dice is set to be larger than the outer diameter of the ends of the small-diameter portions of the hollow shaft material, and the minimum diameter of the spline molding portion is set to be smaller than the outer diameter of the ends of the small-diameter portions of the hollow shaft material. Thus, while each end of the shaft is press-fitted into the dice in the axial direction thereof, a part of the material plastically flows to bulge toward a maximum diameter portion of the spline molding portion. As a result, the amount of the material flowing in the counter press-fit direction is reduced in comparison with conventional cases. Thus, the tooth thickness at the terminal end of the spline is restrained from increasing, so the spline can be molded with accuracy.

It is preferable that the maximum diameter of the spline do not come into contact with the maximum diameter of the spline molding portion of the dice in molding the spline. The material, which has plastically flowed to bulge toward the maximum diameter of the spline molding portion of the dice, does not come into contact with the maximum diameter of the spline molding portion. Therefore, the material does not stagnate at an inlet portion of the dice, and an amount of the material flowing in the counter press-fit direction is further reduced. Thus, the spline can be molded with higher accuracy.

For example, a metal material such as a carbon steel for machine structural use such as STKM or STMA, an alloy steel obtained by adding an alloy element to the carbon steel as a base to improve workability, hardening properties, and the like, or a case-hardened steel such as SCr, SCM, or SNCM can be used as a substance of the pipe material forming the shaft. Any one of a seamless pipe, an electro-welded pipe, a forge-welded pipe, and a cold-drawn pipe can be adopted as the pipe material.

Swaging, press working, or the like is adopted as the aforementioned plastic working. The former, namely, swaging includes rotary swaging and link-type swaging. Either of rotary swaging and link-type swaging can be adopted. For example, in rotary swaging, which is a working method for drawing a pipe material, a pair of dices and backers or a plurality of pairs of dices and backers, which have been built in a main shaft within a machine, make rotational movements, and also make vertical movements having a certain stroke due to an outer peripheral roller and protrusions on the backers, so the pipe is struck while being inserted. In press working, which is another working method for drawing a pipe material, the pipe material is pressed into a dice in an axial direction thereof. The pipe material may be drawn either partially along the axially opposite lateral portion thereof or entirely along the axial range thereof.

In order to achieve the above-mentioned still another object, according to the present invention, there is provided a hollow power transmission shaft, including: a large-diameter portion formed along an axially central portion thereof; small-diameter portions, which are formed along axially opposite lateral portion thereof, and are located laterally with respect to the large-diameter portion; and a hollow portion formed along an inner periphery thereof, in which the hollow portion is filled with a resin foam to be sealed by the resin foam.

In the aforementioned construction, it is sufficient that at least the end regions of the hollow portion are filled with the resin foam. However, with a view to simplifying an operation of filling the hollow portion with the resin foam and improving a sealing effect of the hollow portion, it is preferable that the hollow portion be filled along the entire axial range thereof with the resin foam.

Urethane foam, expanded polystyrene, foamed polypropylene, or the like can be adopted as the aforementioned resin foam. Urethane foam, especially rigid urethane foam is preferred from the standpoints of durability, heat insulating properties, lightness, self-adherence, economical efficiency, and the like.

The present invention can provide a method of manufacturing a hollow power transmission shaft, which makes it possible to ensure stable quality even when there is a difference in wall thickness or hardening ratio along an axial direction thereof.

The present invention also makes it possible to mold with accuracy a spline of the hollow power transmission shaft of this type by means of press working.

According to the present invention, it is possible to provide a hollow power transmission shaft having a construction in which a hollow portion is filled with a resin foam to be sealed thereby, and which is thus reduced in weight, manufactured at low cost, composed of a small number of parts, and designed such that an operation of sealing the hollow portion can be performed more easily than in a case of a conventional construction in which a sealing plug made of metal, rubber, or elastomer is used.

BRIEF DESCRIPTION OF THE DRAWINGS

In the accompanying drawings:

FIG. 10A is an enlarged sectional view showing a press working process, and FIG. 10B is an enlarged sectional view of a spline terminal end of the power transmission shaft;

DETAILED DESCRIPTION OF THE INVENTION

Embodiments of the present invention will be described with reference to the drawings.

Figure 1:
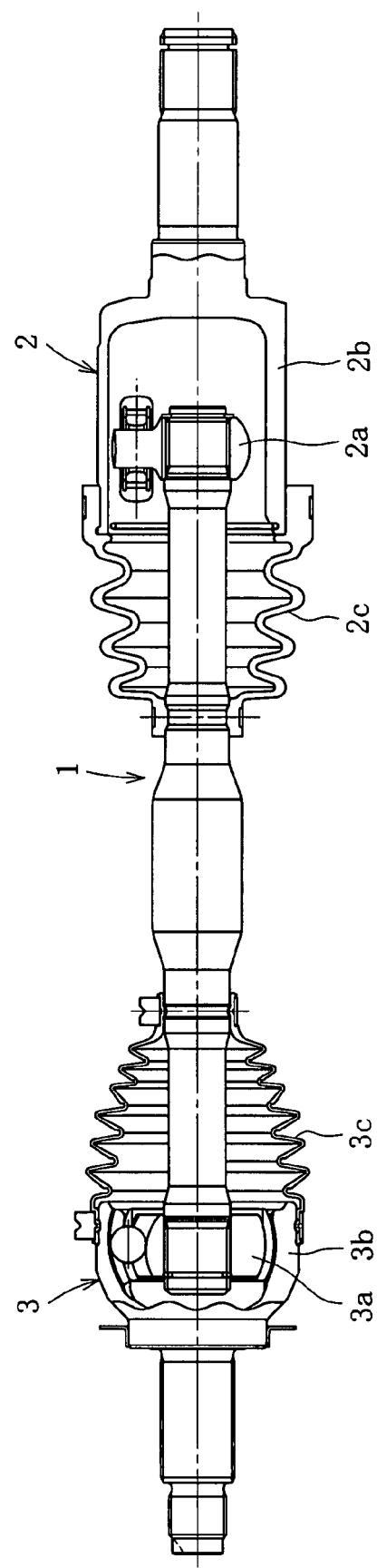
FIG. 1 is a view showing a power transmission mechanism of an automobile.

FIG. 1 shows a power transmission mechanism for an automobile which is equipped with a hollow power transmission shaft 1, a slidable constant velocity universal joint 2 coupled to one end of the power transmission shaft 1, and a fixed constant velocity universal joint 3 coupled to the other end of the power transmission shaft 1. In the power transmission mechanism according to this embodiment, the slidable constant velocity universal joint 2 is coupled to a reducing gear (differential), and the fixed constant velocity universal joint 3 is coupled to a driving wheel side. The power transmission shaft 1 is spline-coupled at one end thereof to a tripod member 2a of the slidable constant velocity universal joint 2, and a boot 2c is fixed to each of an outer periphery of an end of an outer wheel 2b of the slidable constant velocity universal joint 2 and an outer periphery of the power transmission shaft 1. The power transmission shaft 1 is spline-coupled at the other end thereof to an inner wheel 3a of the fixed constant velocity universal joint 3, and a boot 3c is fixed to each of an outer periphery of an end of an outer wheel 3b of the fixed constant velocity universal joint 3 and the outer periphery of the power transmission shaft 1. In FIG. 1, a tripod-type constant velocity universal joint is illustrated as an example of the slidable constant velocity universal joint 2, and a Birfield-type constant velocity universal joint is illustrated as an example of the fixed constant velocity universal joint 3. However, other types of constant velocity universal joints may also be employed.

Figure 2:
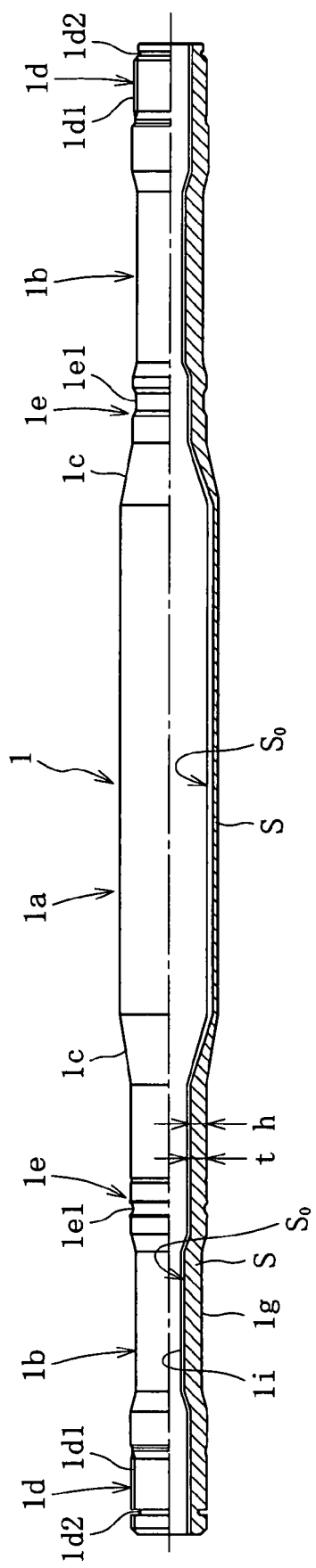
FIG. 2 is a sectional view showing a power transmission shaft according to an embodiment of the present invention.

FIG. 2 shows the power transmission shaft (drive shaft) 1. The power transmission shaft 1 is hollow over an entire axial range thereof. The power transmission shaft 1 has a large-diameter portion 1a along an axially central portion thereof and small-diameter portions 1b along axially opposite lateral portions thereof respectively, which are located laterally with respect to the large-diameter portion 1a. The large-diameter portion 1a is continuous with the small-diameter portions 1b via tapered portions 1c respectively, which gradually decrease in diameter toward axial end sides of the power transmission shaft 1 respectively. The small-diameter portions 1b have coupling portions 1d on end sides, which serve to couple the power transmission shaft 1 to the constant velocity universal joints 2 and 3, and boot fixing portions 1e on the axially central portion side, to which the boots 2c and 3c are fixed respectively. Splines 1d1, which are spline-coupled to the constant velocity universal joints 2 and 3 respectively, are formed on the coupling portions 1d respectively. Retaining ring grooves 1d2, in which retaining rings for preventing the power transmission shaft 1 from falling off in the axial direction from the constant velocity universal joints 2 and 3 are to be mounted respectively, are formed in the coupling portions 1d respectively. Fitting grooves 1e1, in which inner peripheries of small-diameter ends of the boots 2c and 3c are to be fitted respectively, are formed in the boot fixing portions 1e respectively.

The large-diameter portion 1a is formed with a relatively small thickness, and the small-diameter portions 1b are formed with a relatively large thickness. The ratio of the wall thickness of the large-diameter portion 1a to the wall thickness of the small-diameter portions 1b (large-diameter portion 1a/small-diameter portions 1b) is equal to or smaller than, for example, 0.7.

As indicated by a hatched area of FIG. 2, the power transmission shaft 1 has a hardened layer S, which results from a hardening treatment, substantially along an entire axial range thereof. Entirely along the axial range of the power transmission shaft 1, the hardened layer S is formed in a region extending from an outer peripheral surface 1g to a predetermined depth h, and an unhardened layer S0, which is not hardened through the hardening treatment, constitutes a region extending from the hardened layer S to an inner peripheral surface 1i. A hardening ratio α, which is defined as a ratio (h/t) of the depth h of the hardened layer S, whose hardness is equal to or higher than a Rockwell hardness of HRC40 (Hv391), to a wall thickness t thereof, is equal to or smaller than, for example, 0.6 as to the large-diameter portion 1a, and equal to or larger than, for example, 0.6 as to the small-diameter portions 1b.

The power transmission shaft 1 constructed as described above is manufactured by, for example, drawing a pipe material to mold a hollow shaft material having a large-diameter portion along an axially central portion thereof and small-diameter portions along axially opposite lateral portion thereof, machining the hollow shaft material as desired (e.g., rolling the splines), and then hardening the hollow shaft material.

Figure 3:
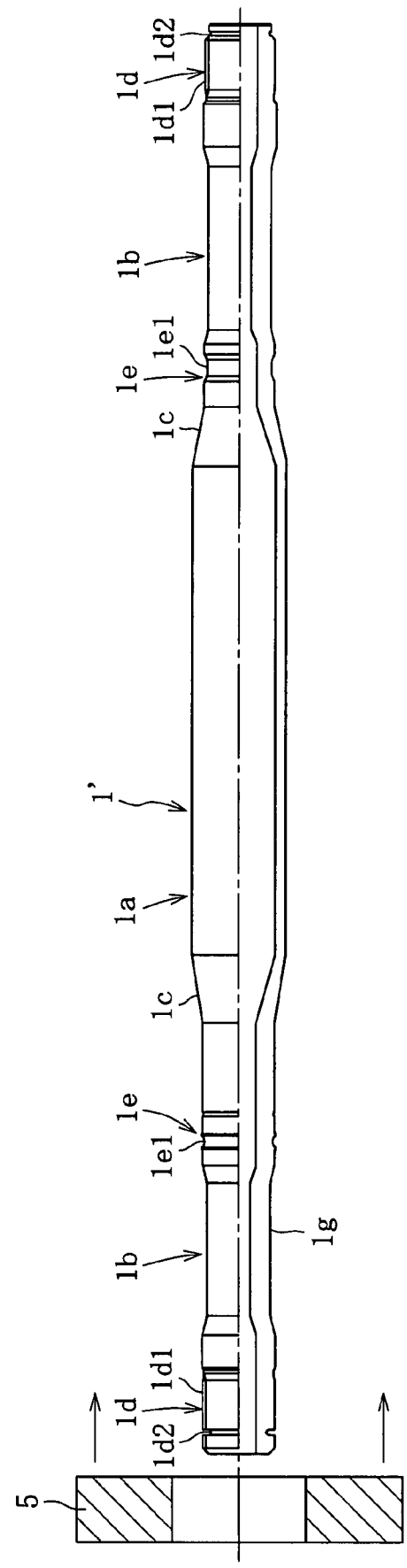
FIG. 3 is a sectional view showing a hollow shaft material.

FIG. 3 shows a hollow pipe material 1' that has not been subjected to the hardening treatment. First of all, a pipe material such as a carbon steel pipe for machine structural use (STKM) is swaged to be molded into a configuration having the large-diameter portion 1a along an axially central portion thereof and the small-diameter portions 1b along axially opposite lateral portions thereof. The splines 1d1 are then molded at ends of the respective small-diameter portions 1b through rolling or the like to form the coupling portions 1d, and the retaining ring grooves 1d2 are formed in the respective coupling portions 1d through rolling, cutting, or the like. Furthermore, the boot fixing grooves 1e1 are formed in respective regions serving as the boot fixing portions 1e through rolling, cutting, or the like.

After that, as shown in FIG. 3, the hollow shaft material 1' is provided with, on an outer peripheral surface 1g side thereof, for example, a movable induction heating coil 5 wrapped therearound. While a high-frequency current with a predetermined frequency is caused to flow through the induction heating coil 5, the induction heating coil 5 is axially moved to perform induction hardening of the hollow shaft material 1' from the outer peripheral surface 1g side. At this moment, the frequency of the high-frequency current caused to flow through the induction heating coil 5 is set relatively low as to the small-diameter portions 1b, which have a relatively small thickness, and the frequency of the high-frequency current caused to flow through the induction heating coil 5 is set relatively high as to the large-diameter portion 1a, which has a relatively small thickness. Thus, even when there is a difference in wall thickness between the large-diameter portion 1a and the small-diameter portions 1b or when there is provided a difference in a hardening ratio a therebetween, heat treatment quality in the respective regions can be improved. As a result, stable quality can be ensured as a whole.

Figure 4:
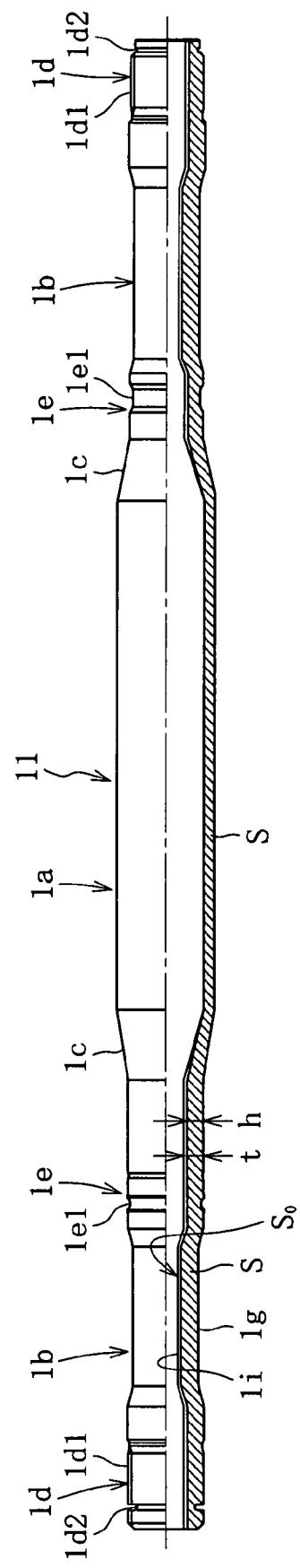
FIG. 4 is a sectional view showing a power transmission shaft according to another embodiment of the present invention.

FIG. 4 shows a hollow power transmission shaft 11 according to another embodiment of the present invention. The power transmission shaft 11 according to this embodiment is different from the aforementioned power transmission shaft 1 in that the hardening ratio a is set to 1.0 as to the large-diameter portion 1a, namely, that the hardened layer S is formed over the entire wall thickness t of the large-diameter portion 1a. This embodiment conforms to the aforementioned embodiment of the present invention in the other respects, so the same description will be omitted.

Figure 5:
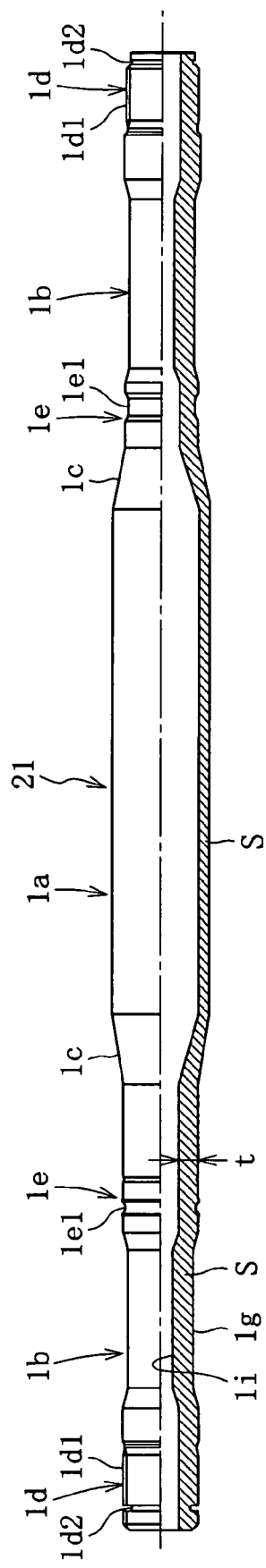
FIG. 5 is a sectional view showing a power transmission shaft according to still another embodiment of the present invention.

FIG. 5 shows a hollow power transmission shaft 21 according to still another embodiment of the present invention. The power transmission shaft 21 according to this embodiment is different from the aforementioned power transmission shaft 1 in that the hardening ratio a is set to 1.0 as to the entire axial range, namely, that the hardened layer S is formed over the entire wall thickness t of the entire axial range. This embodiment conforms to the aforementioned embodiment of the present invention in the other respects, so the same description will be omitted.

Figure 6:
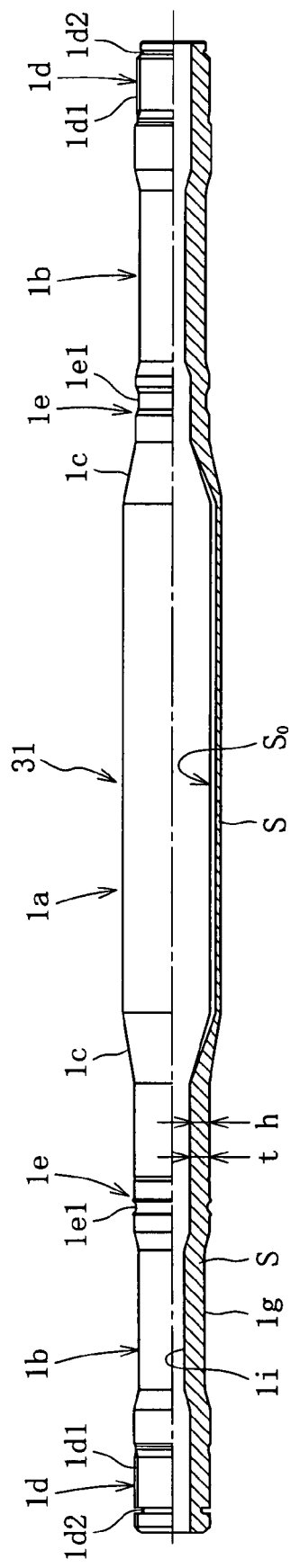
FIG. 6 is a sectional view showing a power transmission shaft according to still another embodiment of the present invention.

FIG. 6 shows a hollow power transmission shaft 31 according to still another embodiment of the present invention. The power transmission shaft 31 according to this embodiment is different from the aforementioned power transmission shaft 1 in that the hardening ratio a is set to 1.0 as to the small-diameter portions 1b, namely, that the hardened layer S is formed over the entire wall thickness t of each of the small-diameter portions 1b. This embodiment conforms to the aforementioned embodiment of the present invention in the other respects, so the same description will be omitted.

Figure 7:
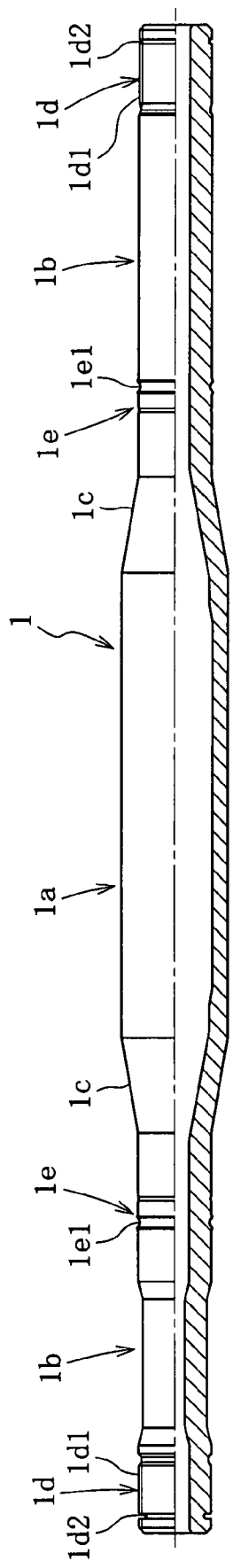
FIG. 7 is a partially sectional view showing another hollow power transmission shaft.

FIG. 7 shows the power transmission shaft (drive shaft) 1 according to still another embodiment of the present invention. The power transmission shaft 1 is hollow over the entire axial range thereof. The power transmission shaft 1 has the large-diameter portion 1a along the axially central portion thereof and the small-diameter portions 1b along the axially opposite lateral portion thereof respectively, which are located laterally with respect to the large-diameter portion 1a. The large-diameter portion 1a is continuous with the small-diameter portions 1b via the tapered portions 1c respectively, which gradually decrease in diameter toward the axial end sides of the power transmission shaft 1 respectively. The small-diameter portions 1b have the coupling portions 1d on the end sides, which serve to couple the power transmission shaft 1 to the constant velocity universal joints 2 and 3, and the boot fixing portions 1e on the axially central portion side, to which the boots 2c and 3c are fixed respectively. The splines 1d1, which are spline-coupled to the constant velocity universal joints 2 and 3 respectively, are formed on the coupling portions 1d respectively. The retaining ring grooves 1d2, in which the retaining rings for preventing the power transmission shaft 1 from falling off in the axial direction from the constant velocity universal joints 2 and 3 are to be mounted respectively, are formed in the coupling portions 1d respectively. The fitting grooves 1e1, in which the inner peripheries of the small-diameter ends of the boots 2c and 3c are to be fitted respectively, are formed in the boot fixing portions 1e respectively.

The power transmission shaft 1 has a hardened layer formed by a hardening treatment substantially over the entire axial range thereof, except regions extending from the vicinities of the retaining ring grooves 1d2 to the axial ends respectively. The hardened layer is formed over a region extending from the outer peripheral surface of the power transmission shaft 1 to a predetermined depth or a full depth.

The power transmission shaft 1 constructed as described above is manufactured by, for example, swaging a pipe material to mold a hollow shaft material having the large-diameter portion 1a along an axially central portion thereof and the small-diameter portions 1b along axially opposite lateral portion thereof, machining the hollow shaft material as desired (e.g., molding the splines 1d1), and then hardening the hollow shaft material.

Figure 8A:
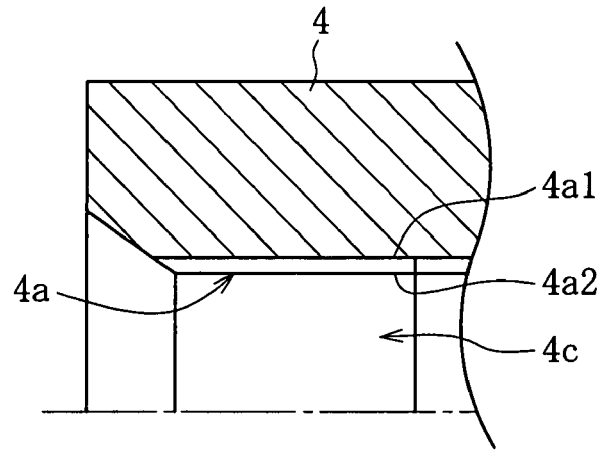
FIG. 8A is a longitudinal sectional view showing a spline molding portion of a dice.
Figure 8B:
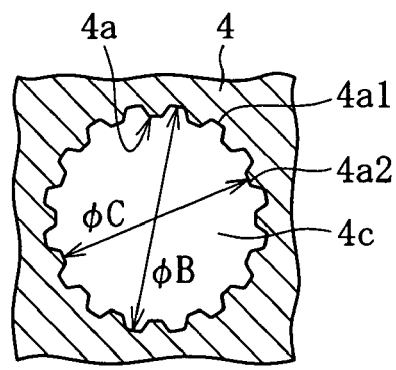
FIG. 8B is a transverse sectional view showing the spline molding portion of the dice.

FIG. 8 shows a dice 4 used in a process of molding the splines 1d1 on the coupling portions 1d of the small-diameter portions 1b of the hollow shaft material respectively. The dice 4 has a dice hole 4c and a spline molding portion 4a, which is located in a back region of the dice hole 4c. The spline molding portion 4a has a tooth mold corresponding to the shape of the splines 1d1 (see FIG. 9) to be formed on the coupling portions 1d of the hollow shaft material. A maximum diameter of the tooth mold (diameter defined as a distance between opposed ones of bottom portions 4a1 of the tooth mold) is set to øB, and a minimum diameter of the tooth mold (diameter defined as a distance between opposed ones of top portions 4a2 of the tooth mold) is set to øC.

As shown in FIG. 10, the maximum diameter of the spline molding portion 4a of the dice 4 (diameter defined as a distance between opposed ones of the bottom portions 4a1 of the tooth mold) øB is set larger than an outer diameter øA of the coupling portions 1d of the hollow shaft material, and the minimum diameter (diameter defined as a distance between opposed ones of the top portions 4a2 of the tooth mold) øC is set smaller than the outer diameter øA. Each of the coupling portions 1d of the hollow shaft material is then axially press-fitted into the spline molding portion 4a of the dice 4 constructed as described above. Then, a part of the material of each of the coupling portions 1d plastically flows, so there occurs the flow in which the material bulges toward the maximum diameter of the spline molding portion 4a (bottom portions 4a1 of the tooth mold). Thus, the splines 1d1 are molded on the outer peripheries of the coupling portions 1d respectively. In this embodiment, a relationship among øA, øB, and øC is set such that the material, which has plastically flowed to bulge toward the maximum diameter of the spline molding portion 4a (bottom portions 4a1 of the tooth mold), does not come into contact with the maximum diameter of the spline molding portion 4a (bottom portions 4a1 of the tooth mold).

Figure 9:
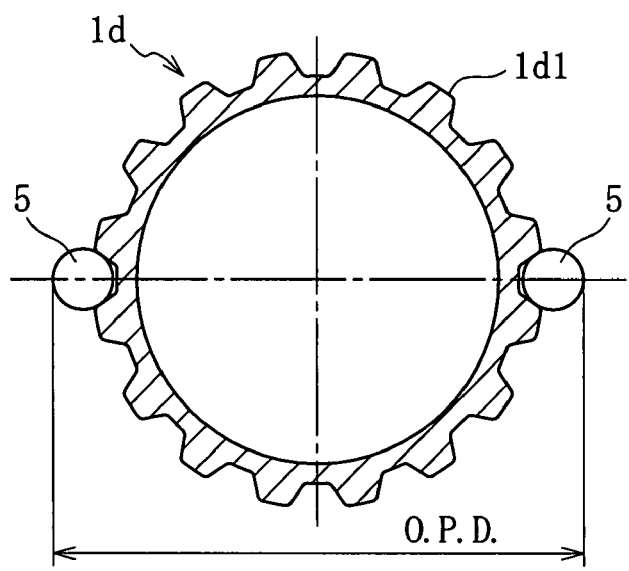
FIG. 9 is a sectional view of a coupling portion of the power transmission shaft.

By setting the relationship øA, øB, and øC as described above, the material is prevented from accumulating at the inlet portion of the spline molding portion 4a of the dice 4 in molding the splines 1d1, so the amount of the material flowing in the counter press-fit direction is further reduced. Accordingly, the splines 1d1 are molded accurately without being substantially increased in O.P.D. at the terminal ends thereof. As shown in FIG. 9, the Over pin diameter (O.P.D.) is a value obtained by placing the pins 5 of a predetermined diameter on those tooth portions of each of the splines 1d1 which are opposed to each other by 180°, and then measuring a maximum spacing dimension between both the pins 5 in the diametral direction of a corresponding one of the coupling portions 1d.

After the splines 1d1 have been molded as described above and the retaining ring grooves 1d2 and the fitting grooves 1e1 of the boot fixing portions 1e have been worked, the hollow shaft material is subjected to a hardening treatment to form the hardened layer. Various means such as induction hardening, carburizing hardening, and carbonitriding hardening can be adopted as the hardening treatment according to the substance of the pipe material, the characteristics required of the power transmission shaft, and the like. However, it is preferable to adopt induction hardening because, for example, the range and depth of the hardened layer can be freely selected and fatigue properties are improved through generation of a residual compressive stress on the surface of the hardened layer. For example, a high-frequency induction heating coil is disposed on the hollow shaft material on the outer peripheral surface side thereof, and induction hardening is performed from the outer peripheral surface side. The induction hardening may be carried out according to either a stationary mode or a movable mode.

Figure 11:
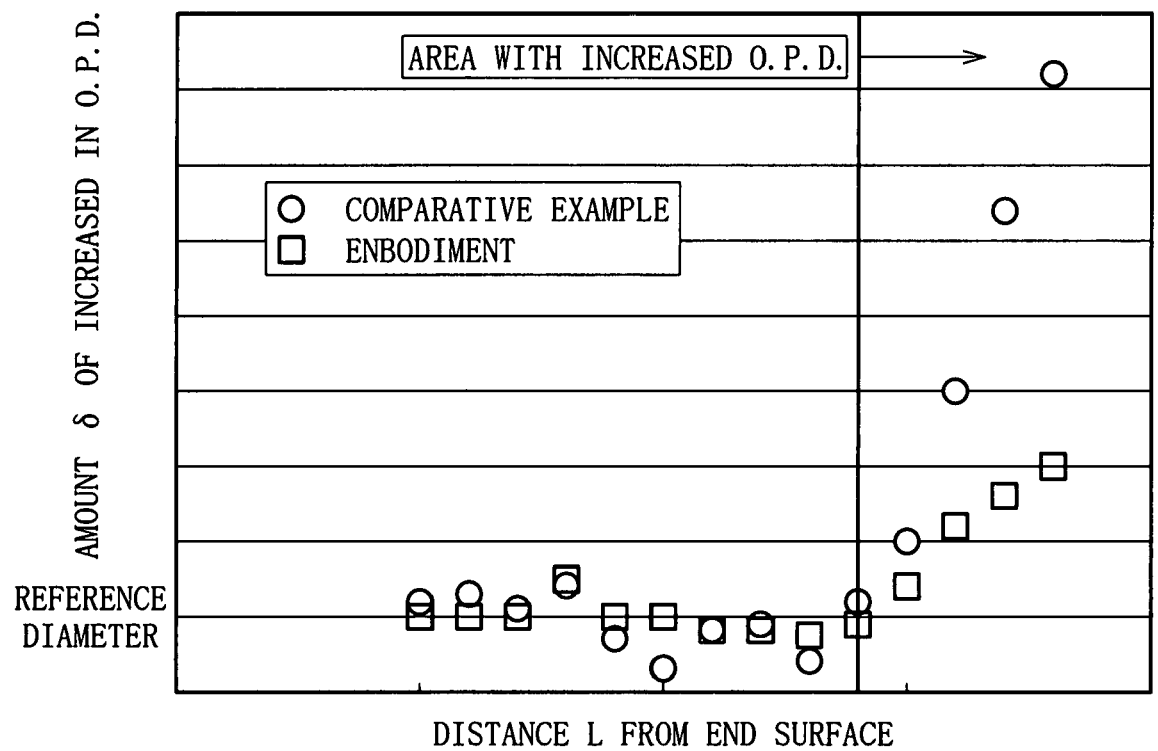
FIG. 11 is a graph showing measurement results of an amount of increase in O.P.D. of a spline.
Figure 12:
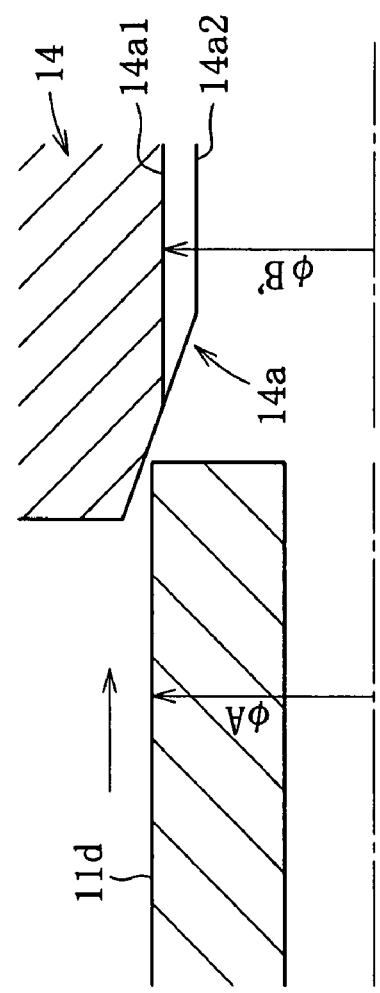
FIG. 12A is an enlarged sectional view showing press working according to a comparative example.
FIG. 12B is an enlarged sectional view of a spline terminal end of a power transmission shaft according to the comparative example.

The amounts δ of increase in O.P.D. were measured as to the embodiment of the present invention in which the splines 1*d*1 are molded on the coupling portions 1*d* of the small-diameter portions 1*b* of the hollow shaft material respectively in the aforementioned manner, and as to a comparative example in which splines 11*d*1 are molded on coupling portions 11*d* of small-diameter portions 11*b* of a hollow shaft material respectively in a manner as shown in FIG. 12. FIG. 11 shows results of the measurement.

In the comparative example, as shown in FIG. 12, a tooth mold has a top portion 14*a*2 and bottom portion 14*a*1. A maximum diameter øB' of a spline molding portion 14*a* of a dice 14 (diameter defined as a distance between opposed ones of bottom portions 14*a*1 of the tooth mold) is set smaller than the outer diameter øA of the coupling portions 11*d* of the hollow shaft material. Each of the coupling portions 11*d* of the hollow shaft material is then axially press-fitted into the spline molding portion 14*a* of the dice 14 constructed as described above to mold a corresponding one of the splines 11*d*1.

As is apparent from the measurement result shown in FIG. 11, while the amount of increase in O.P.D. is relatively small at the terminal end of each of the splines (area with increased O.P.D.) in the embodiment of the present invention, the amount of increase in O.P.D. is significantly large at the terminal end of each of the splines (area with increased O.P.D.) in the comparative example.

Figure 13:
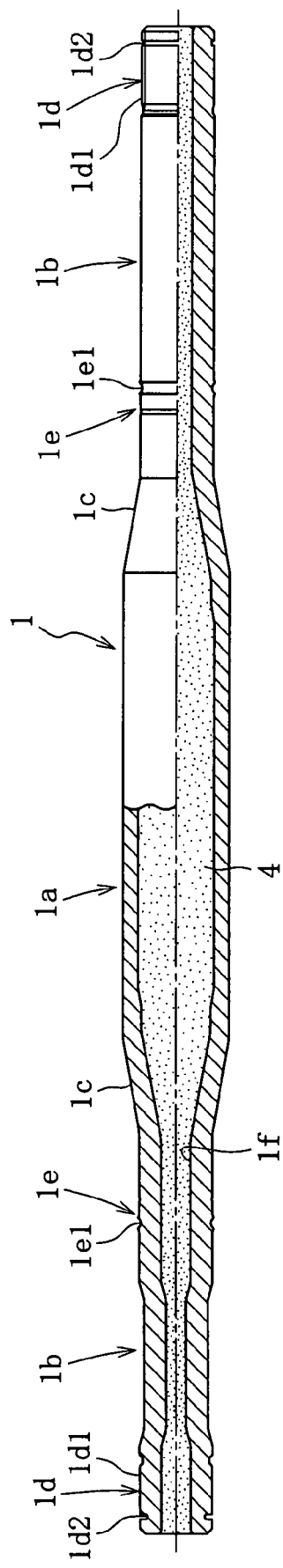
FIG. 13 is a partially sectional view showing a power transmission shaft according to still another embodiment of the present invention.

FIG. 13 shows the power transmission shaft (drive shaft) 1 according to another embodiment of the present invention. The power transmission shaft 1 is hollow along an entire axial range thereof. The power transmission shaft 1 has the large-diameter portion 1*a* along an axially central portion thereof, and the small-diameter portions 1*b* along axially opposite lateral portion thereof, which are located laterally with respect to the large-diameter portion 1*a*. The large-diameter portion 1*a* is continuous with the small-diameter portions 1*b* via the tapered portions 1*c* respectively, which gradually decrease in diameter toward axial end sides of the power transmission shaft 1 respectively. The small-diameter portions 1*b* have the coupling portions 1*d* on end sides, which serve to couple the power transmission shaft 1 to the constant velocity universal joints 2 and 3 respectively, and the boot fixing portions 1*e* on the axially central portion side, to which the boots 2*c* and 3*c* are fixed respectively. The splines 1*d*1, which are spline-coupled to the constant velocity universal joints 2 and 3, are formed on the coupling portions 1*d* respectively. The retaining ring grooves 1*d*2, in which retaining rings for preventing the power transmission shaft 1 from falling off in the axial direction from the constant velocity universal joints 2 and 3 are to be mounted respectively, are formed in the coupling portions 1*d* respectively. The fitting grooves 1*e*1, in which the inner peripheries of the small-diameter ends of the boots 2*c* and 3*c* are to be fitted respectively, are formed in the boot fixing portions 1*e* respectively.

The power transmission shaft 1 has a hardened layer formed by a hardening treatment substantially over the entire axial range thereof, except regions extending from the vicinities of the retaining ring grooves 1*d*2 to the axial ends respectively. The hardened layer is formed over a region extending from the outer peripheral surface of the power transmission shaft 1 to a predetermined depth or a full depth.

Furthermore, the power transmission shaft 1 has a hollow portion 1*f* filled with a resin foam 4 along an inner periphery thereof, and the hollow portion 1*f* is sealed by the resin foam 4. In this embodiment, the resin foam 4 is hard urethane foam. The hollow portion 1*f* is filled over an entire axial range thereof with the resin foam 4. The resin foam 4, with which the hollow portion 1*f* is filled, prevents grease enclosed in the constant velocity universal joints 2 and 3 from entering the hollow portion 1*f*.

The power transmission shaft 1 constructed as described above is manufactured by, for example, drawing a pipe material to mold the hollow shaft material having the large-diameter portion 1*a* along the axially central portion thereof and the small-diameter portions 1*b* along the axially opposite lateral portion thereof, machining the hollow shaft material as desired (e.g., rolling the splines 1*d*1), hardening the hollow shaft material, and then filling the hollow portion 1*f* with the resin foam 4.

For example, a carbon steel for machine structural use such as STKM or STMA, an alloy steel obtained by adding an alloy element to the carbon steel as a base to improve workability, hardening properties and the like, or a case-hardened steel such as SCr, SCM, or SNCM can be used as a substance of the pipe material. Any one of a seamless pipe, an electro-welded pipe, a forge-welded pipe, and a cold-drawn pipe can be adopted as the pipe material.

Swaging, press working, or the like is adopted as the aforementioned drawing. The former, namely, swaging includes rotary swaging and link-type swaging. Either of rotary swaging and link-type swaging can be adopted. For example, in rotary swaging, which is a working method for drawing a pipe material, a pair of dices and backers or a plurality of pairs of dices and backers, which have been built in a main shaft within a machine, make rotational movements, and also make vertical movements having a certain stroke due to an outer peripheral roller and protrusions on the backers, so the pipe material is struck while being inserted. In press working, which is another working method for drawing a pipe material, the pipe material is pressed into a dice in an axial direction thereof. The pipe material may be drawn either over an entire axial range thereof or partially along the axially opposite lateral portion thereof. In this embodiment, the pipe material is drawn over the entire axial range thereof.

The splines 1*d*1 are molded at the ends of the small-diameter portions 1*b* of the hollow shaft material drawn as described above through rolling or the like to form the coupling portions 1*d*, respectively, and the retaining ring grooves 1*d*2 are formed in the coupling portions 1*d* respectively through rolling, cutting, or the like. Further, the boot fixing grooves 1*e*1 are formed in the regions serving as the boot fixing portions 1*e* respectively through rolling, cutting, or the like.

After that, the aforementioned hollow shaft material is subjected to a hardening treatment to form the hardened layer. Various means such as induction hardening, carburizing hardening, and carbonitriding hardening can be adopted as the hardening treatment according to a substance of the pipe material, characteristics required of the power transmission shaft, and the like. However, it is preferable to adopt induction hardening because, for example, the range and depth of the hardened layer can be freely selected and an improvement in anti-fatigue strength is achieved through generation of a residual compressive stress on the surface of the hardened layer. For example, a high-frequency induction heating coil is disposed on the hollow shaft material on the outer peripheral surface side thereof, and induction hardening is performed from the outer peripheral surface side. The induction hardening may be carried out according to either a stationary mode or a movable mode.

A raw material of urethane foam is injected into the hollow portion 1f of the power transmission shaft 1 manufactured through the aforementioned processes from, for example, one end side thereof, and then expanded within the hollow portion 1f. Thus, the hollow portion 1f is filled with the resin foam 4 in an expanded state. As a result, the hollow portion 1f is sealed by the resin foam 4.

What is claimed is:

1. A method of producing a hollow power transmission shaft having a large-diameter portion formed along an axially central portion thereof and small-diameter portions formed along axially opposite lateral portions thereof, the small-diameter portions being located laterally with respect to the large-diameter portion, said method comprising:
   subjecting a pipe material to plastic working to mold a hollow shaft material having the large-diameter portion and the small-diameter portions; and
   performing induction hardening of the hollow shaft material with a frequency of a frequency current in a predetermined region thereof set different from a frequency of a frequency current in another region thereof,
   wherein the frequency of the frequency current in performing induction hardening of the large-diameter portion of the hollow shaft material is set higher than the frequency of the frequency current in performing induction hardening of the small-diameter portions of the hollow shaft material, and
   wherein a hardened layer is formed in an outer peripheral surface of the large-diameter portion and the small-diameter portions while leaving an unhardened layer in the inner peripheral surface of the large-diameter portion and the small-diameter portions, such that a hardening ratio is less than 0.6 in the large-diameter portion while being 0.6 or more in the small-diameter portions, and
   wherein the hardening ratio is defined as a ratio of a depth of the hardened layer having a Rockwell hardness of HRC40 or more to a wall thickness of the large-diameter portion and the small-diameter portions.

* * * * *